(12) United States Patent
Kumar et al.

(10) Patent No.: US 9,880,186 B2
(45) Date of Patent: Jan. 30, 2018

(54) TELEMATICS DEVICES AND METHODS FOR VEHICLE SPEEDING DETECTION

(71) Applicant: Laird Technologies, Inc., Earth City, MO (US)

(72) Inventors: Pranav Kumar, Holly, MI (US); Balachander Rajakondala, Holly, MI (US)

(73) Assignee: Laird Technologies, Inc., Earth City, MO (US)

(*) Notice: Subject to any disclaimer, the term of this patent is extended or adjusted under 35 U.S.C. 154(b) by 0 days.

(21) Appl. No.: 15/471,561

(22) Filed: Mar. 28, 2017

(65) Prior Publication Data
US 2017/0200331 A1    Jul. 13, 2017

Related U.S. Application Data

(63) Continuation of application No. PCT/US2015/052634, filed on Sep. 28, 2015.
(Continued)

(51) Int. Cl.
*G01P 1/10* (2006.01)
*G01P 1/00* (2006.01)
(Continued)

(52) U.S. Cl.
CPC ............ *G01P 1/103* (2013.01); *B60R 25/102* (2013.01); *G01P 1/06* (2013.01); *G01P 1/10* (2013.01);
(Continued)

(58) Field of Classification Search
CPC .... G01P 1/103; G01P 1/06; G01P 1/10; G01P 1/106; G07C 5/0808; G07C 5/008; G07C 5/02; G01S 19/52; B60R 25/102
See application file for complete search history.

(56) References Cited

U.S. PATENT DOCUMENTS 5,381,128 A   1/1995  Kaplan
5,539,647 A   7/1996  Shibata et al.
(Continued)

FOREIGN PATENT DOCUMENTS

CN   101197022 A   6/2008
CN   102693643 A   9/2012
(Continued)

OTHER PUBLICATIONS

Corkery et al.; MIss a Payment? Good Luck Moving That Car; dated Sep. 24, 2014; The New York Times; 9 pages.
(Continued)

*Primary Examiner* — Dale W Hilgendorf
(74) *Attorney, Agent, or Firm* — Harness, Dickey & Pierce, P.L.C.

(57) ABSTRACT

Exemplary embodiments are provided of telematics devices and exemplary corresponding methods. In an exemplary embodiment, a telematics device generally includes a controller and a wireless communication module for transmitting data to a remote station. The controller is configured to periodically obtain the speed of a vehicle, determine when the speed of the vehicle has exceeded a first speed threshold, store the monitored speed as a max speed value, and compare each successive monitoring interval speed to a previous monitoring interval speed. When the successive monitoring interval speed is greater than the max speed value, the max speed value is updated. A speeding event occurs when each successive monitoring interval speed is above the first speed threshold for a speed duration, and/or when any successive monitoring interval speed exceeds a second speed threshold.

22 Claims, 6 Drawing Sheets

Related U.S. Application Data

(60) Provisional application No. 62/057,106, filed on Sep. 29, 2014, provisional application No. 62/057,125, filed on Sep. 29, 2014.

(51) Int. Cl.
    *G07C 5/08*         (2006.01)
    *G07C 5/00*         (2006.01)
    *B60R 25/10*       (2013.01)
    *G07C 5/02*         (2006.01)
    *G01S 19/52*       (2010.01)
    *B60R 25/102*     (2013.01)

(52) U.S. Cl.
    CPC .............. *G01P 1/106* (2013.01); *G01S 19/52* (2013.01); *G07C 5/008* (2013.01); *G07C 5/02* (2013.01); *G07C 5/0808* (2013.01)

(56) References Cited

U.S. PATENT DOCUMENTS

| | | |
|---|---|---|
| 5,612,578 A | 3/1997 | Drew |
| 5,619,412 A | 4/1997 | Hapka |
| 5,722,378 A | 3/1998 | Sawazaki et al. |
| 5,802,545 A | 9/1998 | Coverdill |
| 5,841,026 A | 11/1998 | Kirk et al. |
| 5,969,595 A | 10/1999 | Schipper et al. |
| 6,088,650 A | 7/2000 | Schipper et al. |
| 6,195,648 B1 | 2/2001 | Simon et al. |
| 6,249,217 B1 | 6/2001 | Forbes |
| 6,424,157 B1 | 7/2002 | Gollomp et al. |
| 6,438,487 B1 | 8/2002 | Mingo et al. |
| 6,502,035 B2 | 12/2002 | Levine |
| 6,509,868 B2 | 1/2003 | Flick |
| 6,510,381 B2 | 1/2003 | Grounds et al. |
| 6,512,465 B2 | 1/2003 | Flick |
| 6,549,846 B1 | 4/2003 | Dance et al. |
| 6,609,064 B1 | 8/2003 | Dean |
| 6,611,755 B1 | 8/2003 | Coffee et al. |
| 6,664,888 B1 | 12/2003 | Bishop |
| 6,765,499 B2 | 7/2004 | Flick |
| 6,839,614 B1 | 1/2005 | Timko et al. |
| 6,871,067 B2 | 3/2005 | Clark et al. |
| 6,909,985 B2 | 6/2005 | Stana |
| 6,925,984 B2 | 8/2005 | Minato |
| 6,983,202 B2 | 1/2006 | Sanqunetti |
| 6,993,658 B1 | 1/2006 | Engberg et al. |
| 7,042,343 B2 | 5/2006 | Konno et al. |
| 7,078,828 B2 | 7/2006 | Suzuki |
| 7,088,219 B2 | 8/2006 | Dawson et al. |
| 7,091,629 B2 | 8/2006 | Hawkins |
| 7,119,696 B2 | 10/2006 | Borugian |
| 7,178,503 B1 | 2/2007 | Brehob |
| 7,184,866 B2 | 2/2007 | Squires et al. |
| 7,266,507 B2 | 9/2007 | Simon et al. |
| 7,323,970 B1 | 1/2008 | Murray et al. |
| 7,327,250 B2 | 2/2008 | Harvey |
| 7,366,589 B2 | 4/2008 | Habermas |
| 7,487,029 B2 | 2/2009 | Feeney et al. |
| 7,519,014 B2 | 4/2009 | Allen et al. |
| 7,538,655 B1 | 5/2009 | King |
| 7,571,036 B2 | 8/2009 | Olsen et al. |
| 7,652,576 B1 | 1/2010 | Crossno et al. |
| 7,667,580 B2 | 2/2010 | Tauchi et al. |
| 7,701,363 B1 | 4/2010 | Zlojutro |
| 7,706,963 B2 | 4/2010 | Parikh et al. |
| 7,720,486 B2 | 5/2010 | Ross et al. |
| 7,725,246 B2 | 5/2010 | Abendroth et al. |
| 7,761,232 B2 | 7/2010 | Woodings |
| 7,768,377 B2 | 8/2010 | Brey |
| 7,810,469 B2 | 10/2010 | Vigild et al. |
| 7,823,561 B2 | 11/2010 | Omuro et al. |
| 7,826,944 B2 | 11/2010 | Oesterling et al. |
| 7,848,765 B2 | 12/2010 | Phillips et al. |
| 7,860,628 B2 | 12/2010 | Lange |
| 7,881,710 B2 | 2/2011 | Keohane et al. |
| 7,917,253 B2 | 3/2011 | Inbarajan et al. |
| 7,940,173 B2 | 5/2011 | Koen |
| 7,962,260 B2 | 6/2011 | DiCroce et al. |
| 8,019,532 B2 | 9/2011 | Sheha et al. |
| 8,032,273 B2 | 10/2011 | Yang et al. |
| 8,050,811 B2 | 11/2011 | Inbarajan et al. |
| 8,102,247 B2 | 1/2012 | Arakawa |
| 8,103,404 B2 | 1/2012 | Wheatley |
| 8,112,185 B2 | 2/2012 | Wu |
| 8,217,772 B2 | 7/2012 | Morgan et al. |
| 8,253,549 B2 | 8/2012 | Murray et al. |
| 8,269,618 B2 | 9/2012 | Murray et al. |
| 8,280,616 B2 | 10/2012 | Barta |
| 8,306,560 B2 | 11/2012 | Krause et al. |
| 8,341,617 B2 | 12/2012 | Bunn |
| 8,346,420 B2 | 1/2013 | Tarnowsky et al. |
| 8,393,201 B2 | 3/2013 | Jaffe et al. |
| 8,437,935 B2 | 5/2013 | Braunberger et al. |
| 8,452,274 B2 | 5/2013 | Przybylski |
| 8,452,491 B2 | 5/2013 | Miyauchi et al. |
| 8,462,021 B2 | 6/2013 | Welch et al. |
| 8,471,701 B2 | 6/2013 | Yariv et al. |
| 8,473,149 B2 | 6/2013 | Cox |
| 8,482,612 B2 | 7/2013 | Tamir et al. |
| 8,489,271 B2 | 7/2013 | Hergesheimer et al. |
| 8,498,774 B2 | 7/2013 | Schurov |
| 8,510,200 B2 | 8/2013 | Pearlman et al. |
| 8,514,058 B2 | 8/2013 | Cameron |
| 8,559,910 B2 | 10/2013 | Yi et al. |
| 8,587,420 B2 | 11/2013 | Koen |
| 8,588,041 B1 | 11/2013 | Schillinger, Jr. |
| 8,612,137 B2 | 12/2013 | Harris et al. |
| 8,618,923 B2 | 12/2013 | Nakamura |
| 8,620,360 B2 | 12/2013 | Madhavan et al. |
| 8,620,518 B2 | 12/2013 | Bradley et al. |
| 8,649,952 B2 | 2/2014 | Nedorezov et al. |
| 8,655,541 B2 | 2/2014 | You |
| 8,682,525 B1 | 3/2014 | Kalinadhabhotla et al. |
| 8,686,841 B2 | 4/2014 | Macheca et al. |
| 8,700,299 B2 | 4/2014 | Morita et al. |
| 8,706,348 B2 | 4/2014 | Beams et al. |
| 8,723,687 B2 | 5/2014 | Thomas |
| 8,725,344 B2 | 5/2014 | Hamrick et al. |
| 8,727,056 B2 | 5/2014 | Nagda |
| 8,738,214 B2 | 5/2014 | Olsen et al. |
| 8,744,745 B2 | 6/2014 | Pudar et al. |
| 8,751,104 B2 | 6/2014 | Hermann et al. |
| 8,768,537 B2 | 7/2014 | Kim et al. |
| 8,779,912 B2 | 7/2014 | Sverrisson et al. |
| 8,779,947 B2 | 7/2014 | Tengler et al. |
| 8,781,708 B2 | 7/2014 | Wurts et al. |
| 8,787,949 B2 | 7/2014 | Sumcad et al. |
| 8,805,639 B1 | 8/2014 | Musicant et al. |
| 8,825,224 B2 | 9/2014 | Fazi |
| 8,841,999 B2 | 9/2014 | Ali et al. |
| 8,896,464 B2 | 11/2014 | Khachaturian |
| 2002/0008645 A1* | 1/2002 | Flick ................... B60R 25/102 340/988 |
| 2004/0239488 A1 | 12/2004 | Douglass et al. |
| 2006/0149434 A1 | 7/2006 | Bertosa et al. |
| 2006/0247833 A1 | 11/2006 | Malhotra et al. |
| 2007/0001830 A1* | 1/2007 | Dagci ................... G01P 1/103 340/438 |
| 2007/0194881 A1 | 8/2007 | Schwarz et al. |
| 2007/0233342 A1 | 10/2007 | DiCroce et al. |
| 2008/0021637 A1 | 1/2008 | Staton et al. |
| 2008/0221743 A1 | 9/2008 | Schwarz et al. |
| 2008/0255722 A1* | 10/2008 | McClellan ............ B60R 25/102 701/31.4 |
| 2008/0258890 A1* | 10/2008 | Follmer ................ B60R 25/102 340/439 |
| 2010/0023198 A1 | 1/2010 | Hamilton |
| 2010/0121522 A1* | 5/2010 | Wolfson ................ G01S 19/52 701/31.4 |
| 2010/0179897 A1 | 7/2010 | Gafford et al. |
| 2010/0274432 A1* | 10/2010 | Dlugoss ................ G07C 5/085 701/31.4 |
| 2011/0019657 A1 | 1/2011 | Zaher |

(56) References Cited

U.S. PATENT DOCUMENTS

| | | |
|---|---|---|
| 2011/0106373 A1 | 5/2011 | Hergesheimer et al. |
| 2012/0116705 A1 | 5/2012 | Wheatley |
| 2012/0253550 A1 | 10/2012 | Davidson et al. |
| 2012/0289217 A1 | 11/2012 | Riemer et al. |
| 2012/0303203 A1 | 11/2012 | Olsen et al. |
| 2012/0322463 A1 | 12/2012 | Moeller |
| 2013/0002481 A1 | 1/2013 | Solomon |
| 2013/0088371 A1 | 4/2013 | Welch et al. |
| 2013/0099977 A1 | 4/2013 | Sheshadri et al. |
| 2013/0106594 A1 | 5/2013 | Hiramatsu et al. |
| 2013/0117173 A1 | 5/2013 | Schwarz et al. |
| 2013/0141249 A1 | 6/2013 | Pearlman et al. |
| 2013/0144770 A1 | 6/2013 | Boling et al. |
| 2013/0144805 A1 | 6/2013 | Boling et al. |
| 2013/0211694 A1 | 8/2013 | Taglialatela et al. |
| 2013/0212214 A1 | 8/2013 | Lawson et al. |
| 2013/0337801 A1 | 12/2013 | Yi et al. |
| 2014/0006555 A1 | 1/2014 | Shields |
| 2014/0012483 A1 | 1/2014 | Huang et al. |
| 2014/0055529 A1 | 2/2014 | Matsunaga |
| 2014/0074353 A1 | 3/2014 | Lee et al. |
| 2014/0074692 A1 | 3/2014 | Beerle et al. |
| 2014/0111354 A1 | 4/2014 | Hergesheimer et al. |
| 2014/0118169 A1 | 5/2014 | Hamberger et al. |
| 2014/0160288 A1 | 6/2014 | Makaveev et al. |
| 2014/0172190 A1 | 6/2014 | Kalinadhabhotla et al. |
| 2014/0189641 A1 | 7/2014 | Anderson et al. |
| 2014/0210618 A1 | 7/2014 | Poe et al. |
| 2014/0236444 A1 | 8/2014 | Stefan et al. |
| 2014/0248918 A1 | 9/2014 | Yarnold et al. |
| 2014/0266635 A1 | 9/2014 | Roth et al. |
| 2014/0266652 A1 | 9/2014 | Morgan et al. |
| 2014/0266653 A1 | 9/2014 | Morgan et al. |
| 2014/0279293 A1 | 9/2014 | Morgan et al. |
| 2014/0279297 A1 | 9/2014 | Morgan et al. |
| 2014/0279381 A1 | 9/2014 | Morgan et al. |
| 2014/0279449 A1 | 9/2014 | Ginder et al. |

FOREIGN PATENT DOCUMENTS

| | | |
|---|---|---|
| CN | 102797456 A | 11/2012 |
| CN | 103154694 A | 6/2013 |
| CN | 103179175 A | 6/2013 |
| CN | 203637765 U | 6/2014 |
| EP | 2777995 A1 | 9/2014 |
| KR | 10-2006-0032824 | 4/2006 |
| KR | 10-1086738 B1 | 11/2011 |
| KR | 10-1209994 B1 | 12/2012 |
| WO | WO-2013138798 A1 | 9/2013 |

OTHER PUBLICATIONS

International Search Report and Written Opinion for PCT Application No. PCT/US2015/052634 filed Sep. 28, 2015 (published as WO 2016/053870 on Apr. 7, 2016) which is the parent application to the instant application; dated Jan. 26, 2016, 12 pages.

* cited by examiner

TELEMATICS DEVICES AND METHODS FOR VEHICLE SPEEDING DETECTION

CROSS-REFERENCE TO RELATED APPLICATIONS

This application is a continuation of International Application No. PCT/US2015/052634 filed Sep. 28, 2015 (published as WO 2016/053870 on Apr. 7, 2016), which in turn, claims the benefit of U.S. Provisional Application No. 62/057,106 filed Sep. 29, 2014 and U.S. Provisional Application No. 62/057,125 filed Sep. 29, 2014. The entire disclosures of the above applications are incorporated herein by reference.

FIELD

The present disclosure generally relates to devices and methods for vehicle speeding detection.

BACKGROUND

This section provides background information related to the present disclosure which is not necessarily prior art.

Telematics devices (e.g., vehicle tracker devices, etc.) may be coupled to vehicles to track location and other features of the vehicle. The vehicle tracker devices may include communication with a remote station. These devices may allow users to monitor vehicles that are being rented, leased, are subject to a loan, etc. Vehicles speeds may be monitored using a location sensor (e.g., global positioning system (GPS), etc.).

SUMMARY

This section provides a general summary of the disclosure, and is not a comprehensive disclosure of its full scope or all of its features.

According to various aspects, exemplary embodiments are provided of telematics devices and exemplary corresponding methods. In an exemplary embodiment, a telematics device generally includes a controller, and a wireless communication module coupled to the controller. The wireless communication module is configured to transmit data from the controller to a remote station. The controller is configured to periodically obtain the speed of the vehicle according to a monitoring interval and determine a first monitoring interval in which the speed of the vehicle has exceeded a first speed threshold and store the monitored speed as a max speed value. The controller is also configured to compare each successive monitoring interval speed to a previous monitoring interval speed. When the successive monitoring interval speed is greater than the max speed value, the controller is configured to update the max speed value with the successive monitoring interval speed. When each successive monitoring interval speed is above the first speed threshold for a speed duration, the controller is configured to determine that a speeding event has occurred with a speed value equal to the max speed value. When any successive monitoring interval speed exceeds a second speed threshold, the controller is configured to determine that a speeding event has occurred with a speed value equal to the second speed threshold.

According to additional aspects of the present disclosure, an exemplary telematics device generally includes a controller, and a wireless communication module coupled to the controller. The wireless communication module is configured to transmit data from the controller to a remote station. The device also includes a location sensor coupled to the controller and configured to determine a speed of the telematics device. The controller is configured to monitor the speed of the telematics device via the location sensor and/or a vehicle interface connection, count a number of times that the speed of the vehicle exceeds a speed threshold, and when the count exceeds a limit threshold within a specified time period, determine that an aggressive driving event has occurred.

According to additional aspects of the present disclosure, an exemplary telematics device generally includes a controller, and a wireless communication module coupled to the controller. The wireless communication module is configured to transmit data from the controller to a remote station. The device also includes a location sensor coupled to the controller and configured to determine a speed of the telematics device. The controller is configured to monitor the speed of the telematics device via the location sensor and/or a vehicle connection interface. When the speed of the vehicle exceeds a first speed threshold for at least a speed duration, the controller is configured to determine that a first speeding event has occurred. When the speed of the telematics device exceeds a second speed threshold for at least a speed duration, the controller is configured to determine that a second speeding event has occurred. The second speed threshold is greater than the first speed threshold.

According to additional aspects of the present disclosure, a telematics device for a vehicle generally includes a controller and a wireless communication module coupled to the controller. The wireless communication module is configured to transmit data from the controller to a remote station. The device also includes a location sensor coupled to the controller and configured to determine a speed of the telematics device. The controller is configured to periodically monitor the speed of a vehicle via the location sensor and/or a vehicle interface connection according to a monitoring interval. When the speed of the vehicle exceeds a speed threshold, the controller is configured to monitor a distance traveled by the vehicle while the speed of the telematics device is exceeding the speed threshold, and when the monitored distance traveled exceeds a distance threshold, to determine that a speeding event has occurred.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Disclosed are examples of telematics devices (e.g., low-end telematics devices, etc.) for aftermarket applications (e.g., installed in a vehicle after final manufacturing assembly of the vehicle, etc.). An example device may communicate to one or more servers (e.g., a back end server, etc.) via one or more wireless networks (e.g., a cell network, an SMS gateway, etc.). The device may track vehicle location (e.g., a vehicle tracker device having a global positioning satellite (GPS) receiver, etc.). The device may also monitor vehicle sensor data.

Figure 1:
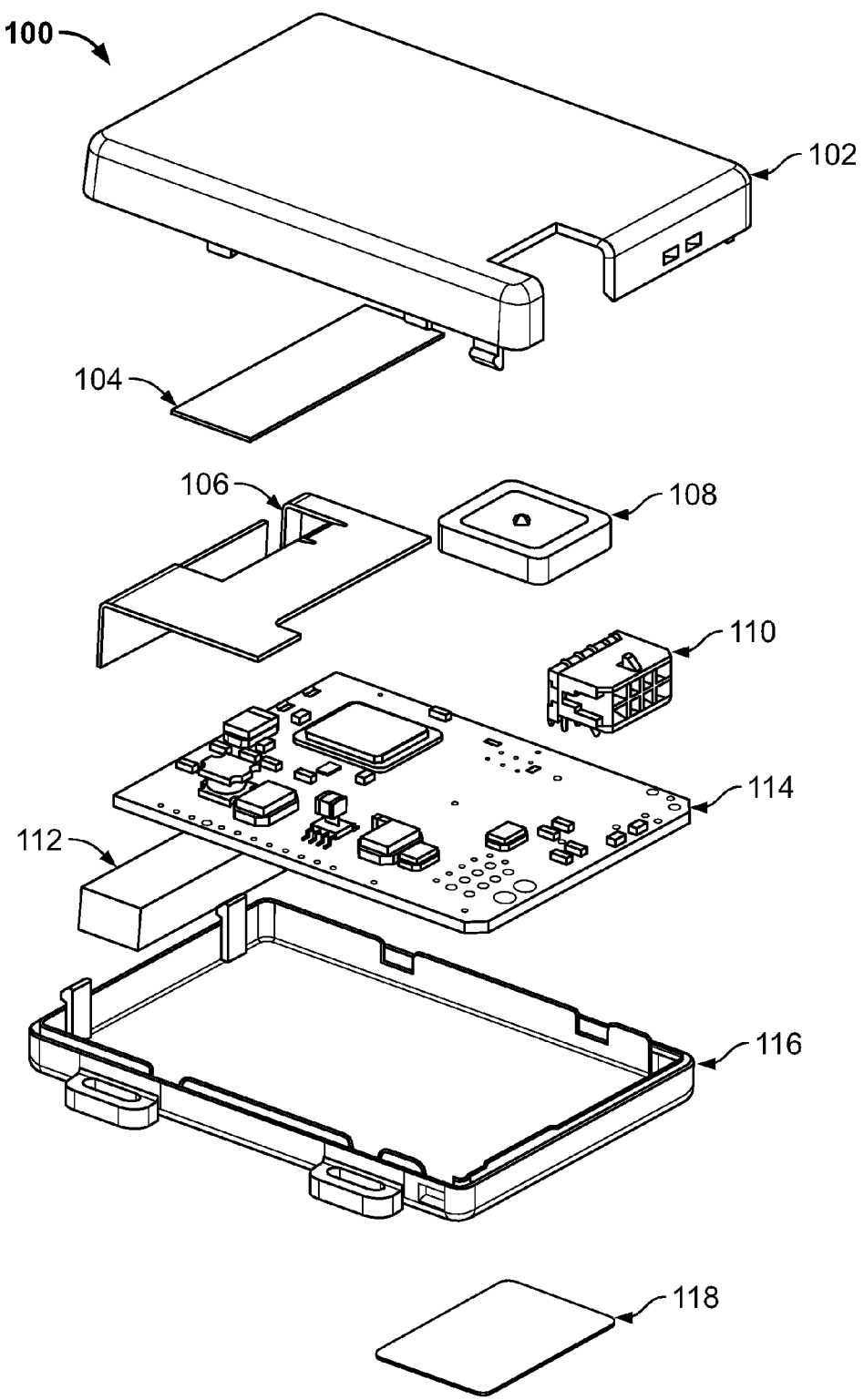
FIG. 1 is an exploded perspective view of a telematics device according to an exemplary embodiment.
Figure 2:
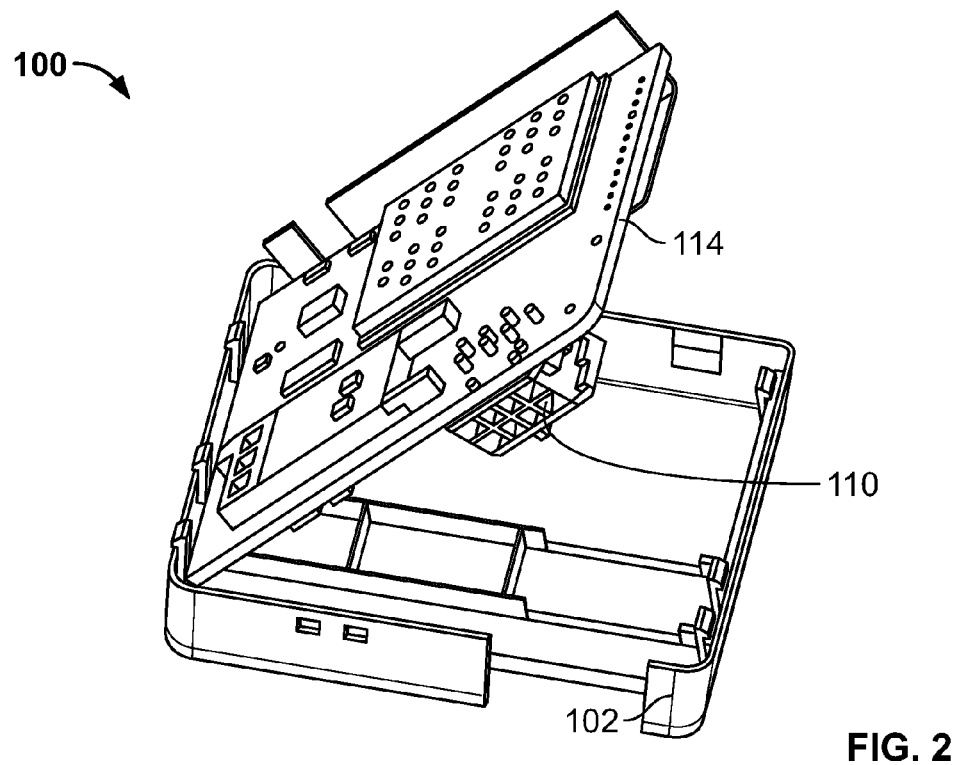
FIG. 2 is another perspective view of the telematics device shown in FIG. 1 showing partial assembly.
Figure 3:
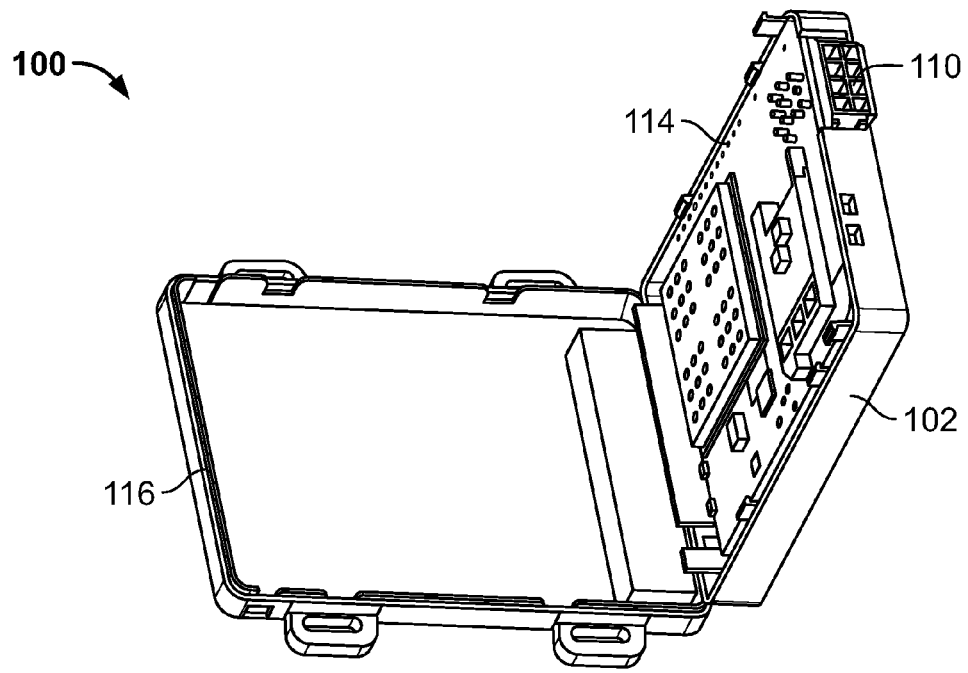
FIG. 3 is another perspective view of the telematics device shown in FIG. 1 showing further assembly.

FIGS. 1-3 illustrate an exemplary embodiment of a vehicle tracker device 100. As shown in FIG. 1, the device 100 includes a cover 102. The cover 102 may be any suitable cover capable of protecting device components while allowing wireless signals to be sent from and/or received by the device 100.

The device 100 also includes an adhesive patch 104 and a cellular antenna element 106 (broadly, a wireless communication module). The cellular antenna element 106 may be any element suitable for sending and/or receiving cellular network signals (e.g., CDMA, GSM, 2G, 3G, 4G, LTE, etc.). The cellular antenna element 106 may transmit location information, event information, etc. to a remote station.

The device 100 includes a global positioning satellite (GPS) patch antenna 108. The GPS patch 108 may be configured to detect GPS signals for determining a location of the device 100, and therefore the vehicle to which the device 100 is coupled. In some embodiments, the GPS patch 108 may be combined with the adhesive patch 104, may be part of the adhesive patch 104, etc. Some embodiments may not include an adhesive patch 104.

The device 100 includes a connector 110. The connector 110 may include any suitable connections for powering the device 100 (e.g., via vehicle battery, alternator, other power source, etc.), reading vehicle sensors (e.g., an ignition line, etc.), other suitable connectors, connection to the vehicle starter to enable/disable the starter, etc.

A printed circuit board assembly (PCBA) 114 may include any suitable device components. In this illustrated embodiments, the PCBA 114 may include the adhesive patch 104, cellular antenna element 106, GPS patch 108, connector 110, etc.

The device 100 may also include a foam pad 112. The foam pad 112 may provide support for one or more device components (e.g., PCBA 114, etc.) within the housing 116. The foam pad 112 may be positioned to help hold one or more device components in place and/or inhibit vibrations during travel of the vehicle to which the device 100 is mounted.

The housing 116 may be coupled to the cover 102 such that the housing 116 and cover 102 cooperatively define an interior for housing the various device components, e.g., PCBA 114, adhesive patch 104, cellular antenna element 106, GPS patch 108, connector 110, etc.

The housing 116 and cover 102 may be made out of the same or similar dielectric material, e.g., plastic, etc. A label 118 may be adhesively attached to an outer surface of the housing 116. The label 118 may include information for identifying the particular device 100.

The device 100 may also include an accelerometer or other component for detecting motion, a port (e.g., serial port, etc.) for programming the device 100, a controller (e.g., a 16 bit microcontroller with flash memory, etc.), a relay driver to enable and/or disable a vehicle starter, a power supply (e.g., a 12V to 3.35V DC to DC power supply, an RF front end, one or more analog inputs, a SIM card for GSM, etc.), etc.

As shown in FIG. 2, the PCBA 114 may snap into the cover 102. As shown in FIG. 3, the cover 102 and PCBA 114 may then snap into the housing 116. In other embodiments, the PCBA 114 may be coupled to the cover 102 and housing 116 using other suitable techniques, including friction fits, fasteners, etc.

Figure 4:
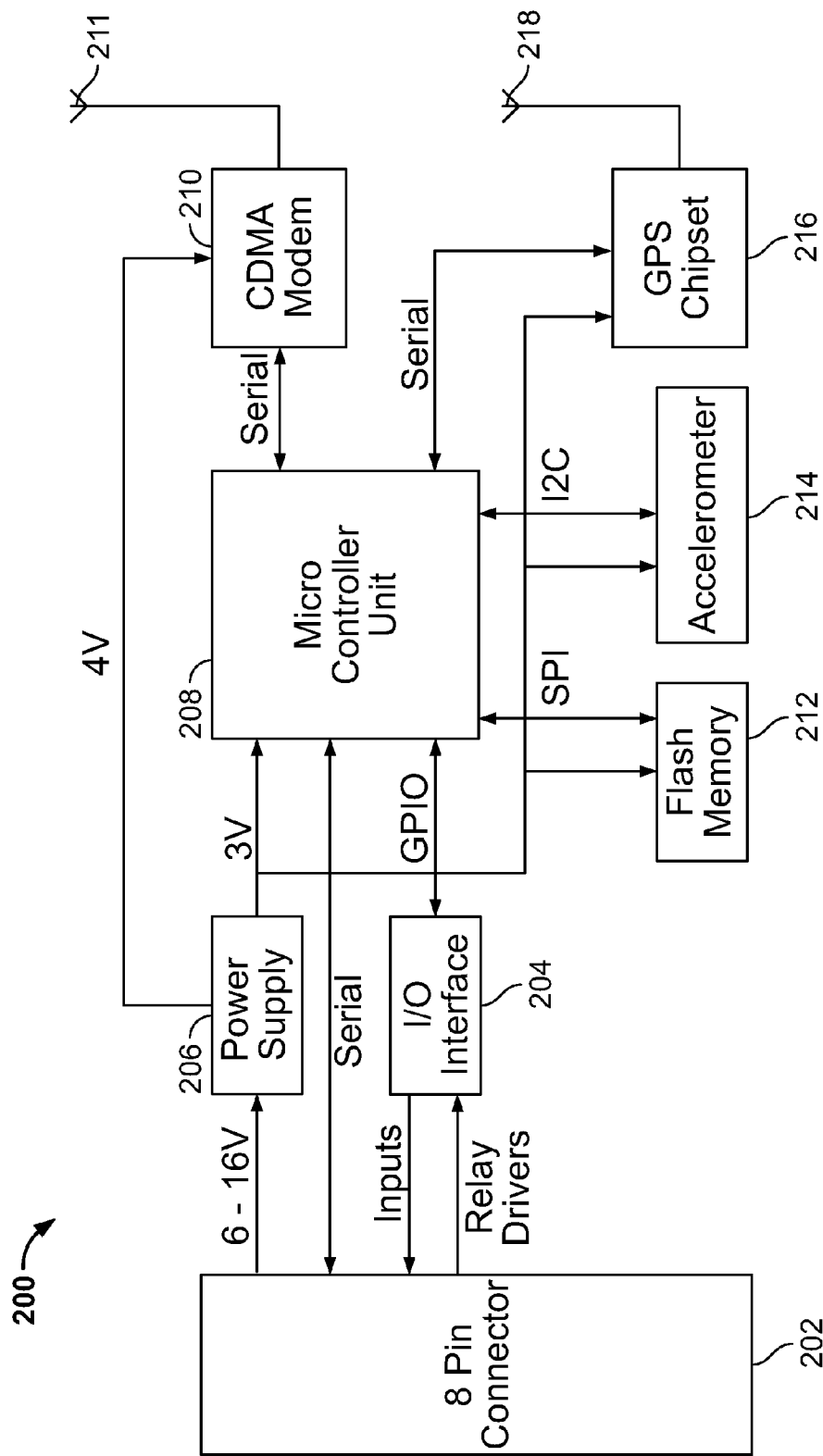
FIG. 4 is a block diagram of an exemplary system architecture of the telematics device of FIG. 1 according to another exemplary embodiment.

FIG. 4 illustrates an example system architecture 200 of the device 100. The system architecture 200 includes an 8-pin connector 202. In other embodiments, more and/or other types of connectors may be used. The architecture 200 includes an input/output (I/O) interface 204 and a power supply 206. The power supply 206 converts an input voltage in the range of about 6 volts (V) to 16V into an output voltage of about 3V and 4V. In other embodiments, other voltages may be used.

System architecture 200 includes a micro controller unit 208 (broadly, a controller), which may be any suitable processor. The micro controller unit 208 is coupled to the power supply 206, which converts the input voltage in the range of about 6 volts (V) to 16V into an output voltage of about 3V for the micro controller unit 208. FIG. 4 also shows the micro controller unit 208 coupled to the I/O interface 204 via GPIO (General Purpose Input/Output).

System architecture 200 includes a flash memory 212, although other suitable memory may be used in other embodiments. In this example, FIG. 4 shows the flash memory 212 coupled to the micro controller unit 208 via SPI (Serial Peripheral Interface) bus. The flash memory 212 is also coupled to the power supply 206, which converts the input voltage in the range of about 6 volts (V) to 16V into an output voltage of about 3V for the flash memory 212.

System architecture 200 also includes a CDMA modem 210 for sending and/or receiving cellular signals via antenna 211. The CDMA modem 210 is coupled to the power supply 206, which converts the input voltage in the range of about 6 volts (V) to 16V into an output voltage of about 4V for the CDMA modem 210. In this example, FIG. 4 shows the CDMA modem 210 coupled to the micro controller unit 208 via a serial connection. Other embodiments may include cellular elements configured to communicate on different cellular networks.

Accelerometer 214 is coupled to the micro controller unit 208 and may detect motion. The accelerometer 214 is also coupled to the power supply 206, which converts the input voltage in the range of about 6 volts (V) to 16V into an output voltage of about 3V for the accelerometer 214. In this example, FIG. 4 shows the accelerometer 214 coupled to the micro controller unit 208 via I2C (Inter-Integrated Circuit), which is a multi-master, multi-slave, single-ended, serial computer bus.

GPS chipset 216 is coupled to the micro controller unit 208 and may receive GPS signals via antenna 218 for determining a location of the GPS chipset 216, and therefore the vehicle tracker device. The GPS chipset 216 is also coupled to the power supply 206, which converts the input voltage in the range of about 6 volts (V) to 16V into an output voltage of about 3V for the GPS chipset 216. In this example, FIG. 4 shows the GPS chipset 216 coupled to the micro controller unit 208 via a serial connection.

Although specific communication protocols, connections, and voltage levels are shown in the labels of FIG. 4, it should be apparent that other embodiments may include other connection layouts, different communication protocols, different voltage levels, etc.

The exemplary telematics devices described herein may provide one or more advantageous features as further described below. Some exemplary embodiments may mirror customer data flow from the telematics devices, provide two-wire vehicle ignition detection, may include M2M (machine to machine), GPS, cellular communication, vehicle finance features, communication, event logging, over the air updates, detect parking events, detect geofences, detect vehicle idling, detect vehicle speeding, include a late payment mode, provide starter enable and/or disable, include customer data flow, include an accelerometer to detect motion, etc.

The following features may be implemented using any suitable techniques, including firmware, software stored in device memory, etc.

The device may send vehicle location and event reports to a remote monitoring station using a secure telnet (STEL) communication protocol. Communication may be with a backend server via an IP message (UDP/TCP), an SMS (Short Message Service) text message, etc. These messages may only be accepted from approved addresses and/or phone numbers loaded into a configuration file. The device may expect an acknowledgement for every message it transmits to the server. If the acknowledgement is not received by the device, the device may resend the same message after a predefined timeout period until it successfully receives an acknowledgement from the server. The device may acknowledge every command it receives from the server.

When cellular network coverage is not available, the device may store reports and/or events internally. When the cellular network coverage is available again, the device may send the saved reports and/or events. The device may respond to a request for location with a location report. The device may allow the server to update and/or change configurations. The configurations may be stored in internal data flash with a unique algorithm. Configurations that are strings may be stored uniquely based on a string buffer technique.

The device may send a daily heartbeat location report, which may include latitude, longitude, date, time, device ID, etc. The heartbeat frequency can be configurable by customers among a choice of presets.

The device may send a parking alert event when the vehicle has been stationary for more than one hour, which may include the device location. This alert may be configurable among a choice of presets.

The device may support geofences, e.g., circular and/or polygon geofences, etc. The server administrator can add, modify, delete, etc. any geofence. The device may check for geofence events every period (e.g., second, etc.). The device may send a geofence alert every time the vehicle transitions from inside to outside of the geofence or vice versa.

When the ignition is OFF, the device may transit to low current draw/low power mode. The device may support over the air (OTA) updates of device firmware. The device may provide basic sanity checks on the new GPS location. If the GPS location is upset, the device may save the last good location. The device may provide location aging.

The device may detect idling events. When the ignition is on and the device is not moving for more than a few minutes, the device may detect this as vehicle idling and report this event. The device may provide speeding events. When the ignition is ON and the device is moving faster than a configured speeding exceed limit for more than a speeding exceed interval, the device may report a speeding exceed event.

The device may support ignition detection based on voltage changes on VBatt line and/or ignition detection on a dedicated ignition line input. The device may trigger a buzzer warning alert for a few seconds on an external connected buzzer every time an ignition ON is detected in a late payment mode (e.g., the vehicle owner is late making a payment on the vehicle, etc.). This late payment mode feature may be enabled or disabled from a remote server.

The device may support disabling of the vehicle engine starter (e.g., for recovery purposes, etc.) and may also provide the capability to override the disabled starter. The device may respond to a request to disable the vehicle by sending an acknowledgment to the request and sending the GPS position report at the time the request is received. Following the acknowledgement of the received disable request, the device may check that conditions for disable of the starter are present. These conditions may include the ignition is OFF, the vehicle is stationary, cellular coverage exists, there is a valid GPS fix, etc. When these conditions are present, the device may send a GPS location report and disable the engine starter.

In some embodiments, the disabled starter may be enabled by toggling the ignition key ON/OFF for a predefined period. For example, the device may support a manual override of the starter disable. Manual starter override (MSO) may require the driver to follow a unique sequence of ON and OFF patterns on the Ignition Key. The MSO may be active for 24 hours.

The starter disable may be overridden by an emergency enable command (e.g., an "EMERGENCYA" command, etc.), which may override the starter disable for about 24 hours, etc.

The device may detect and report if the vehicle is being towed as when conditions are met, including vehicle motion is detected via an accelerometer, vehicle theft/towing detection may be enabled when the ignition is OFF, a towing event may be generated if there is a change in position greater than a predefined limit during ignition OFF, etc.

External sensors may be connected to digital inputs, which may be periodically monitored and can report a change status to the server. External sensors connected on analog inputs may be periodically monitored and can be reported at a predefined periodicity or for a change that is greater than a preconfigured value threshold. For example, the preconfigured value threshold may be a change of 1% of maximum monitored sensor value. Digital outputs may be controlled by the server.

The device may have the ability to send a duplicate data flow to a second server. The second server may be controlled by another party, entity, company, etc. The second data flow may not incorporate all of the reliability features of the primary data flow.

The device may send a signal when the vehicle battery drops below a specific threshold. The accelerometer may be able to detect motion during ignition on and off states. The device may detect hard acceleration and sizeable g force (e.g., to detect vehicle collisions, etc.).

The device may support one or more counters, including an odometer for tracking cumulative distance traveled by the vehicle, an hours on counter for tracking cumulative time ignition has been on, a speeding counter for tracking cumulative time above a threshold speed, a high acceleration events counter for tracking acceleration above a threshold, etc.

The device may have one or more LED's (e.g., a blue LED to indicate cellular signal, a green LED to indicate GPS signal, etc.). The LEDs may blink while searching, and may remain solid when the signal is confirmed. LEDs may be turned off after a preset time.

All events may be grouped based on event group ID's. And, any group events identified by a unique group ID can be enabled or disabled.

The inventors herein have recognized that vehicle speeding may be detected by comparing a speed of the vehicle to a threshold speed limit and determining when the vehicle has exceeded the threshold speed limit for a threshold amount of time. However, false speeding events may be detected when the vehicle is trying to pass another vehicle. For example, the vehicle may go over the threshold speed limit for the duration that the vehicle is passing another vehicle.

The inventors have also recognized that a driver who is aware of the speeding event detection methods may be able to avoid any detected speeding events while still driving near the threshold speed limit for most of the driving time. For example, a driver may continuously stay just below the threshold speed limit, or go above the threshold speed limit repeatedly for a duration just less than the threshold duration. Such driving behavior may be considered aggressive, dangerous, etc., especially if the threshold speed limit is well above a desired speed limit.

According to one example embodiment, a telematics device for a vehicle includes a controller and a wireless communication module coupled to the controller. The controller may be any suitable controller (e.g., microcontroller, microprocessor, digital signal processor (DSP), integrated circuit, programmable logic controller, etc.) and may include a processor, memory, etc. The controller may be configured to implement any suitable method (including the methods described herein) using any suitable combination of hardware and/or software. For example, the controller may include execute computer-executable instructions, etc.

The wireless communication module is configured to transmit data from the controller to a remote station. The wireless communication module may be any module capable of transmitting data, information, etc. from the telematics device to a remote device. For example, the wireless communication module may include a cellular network antenna, a wireless network antenna, a Bluetooth antenna, etc. The remote station may be any suitable station capable of receiving information from the telematics device (e.g., a server, a telematics data storage facility, etc.).

The telematics device includes a location sensor (e.g., global positioning system (GPS) receiver, etc.) which may be configured to determine a location of the telematics device, a speed of the telematics device, etc. Accordingly, the telematics device may be configured to detect location, speed, acceleration, etc. of a vehicle to which the telematics device is connected.

In some embodiments, the telematics device may include a connector for coupling to a vehicle interface connection (e.g., a vehicle bus, a controller area network (CAN) bus of the vehicle, an on-board diagnostics (OBD) connector of the vehicle, etc.). Accordingly, the telematics device may obtain the speed of the vehicle from the vehicle interface connection. For example, the telematics device may read the speed of the vehicle from the vehicle bus.

The controller is configured to periodically monitor the speed of the vehicle via the location sensor and/or the vehicle interface connection according to a monitoring interval. For example, the controller may receive a speed from a GPS receiver at periodic intervals (e.g., every second, etc.). Alternatively, or in addition, the controller may receive a location from the GPS receiver at periodic intervals and determine the speed of the vehicle based on distance traveled between sensed locations during a periodic interval. The telematics device may obtain the speed of the vehicle from the vehicle interface connection. In some embodiments the telematics device may obtain the vehicle speed from both the vehicle interface connection and the location sensor, from only one or the other, etc.

The controller is configured to determine a first monitoring interval in which the speed of the telematics device exceeds a first speed threshold (e.g., 60 miles per hour (mph), 70 mph, 100 kilometers per hour (kph), etc.). The controller may compare each received speed value to the first speed threshold to determine when the monitored speed exceeds the first speed threshold (e.g., when the vehicle speed is above 60 mph, etc.). The controller may then store the detected speed as a max speed value.

The controller then compares each successive monitoring interval speed to a previous monitoring interval speed. The controller may compare each newly received monitored vehicle speed (e.g., the speed received every interval, etc.) with the immediately prior monitored vehicle speed to determine if there is any change (e.g., increase, decrease, etc.) in the vehicle speed during the monitoring interval. This may create a speed hysteresis curve of vehicle speed.

If the successive monitoring interval speed is greater than the max speed value, the controller updates the max speed value with the newly received successive monitoring interval speed. Accordingly, the max speed value may represent the maximum speed reached by the vehicle.

If each successive monitoring interval speed is above the first speed threshold for a speed duration (e.g., ten seconds, thirty seconds, one minute, five minutes, etc.), the controller determines that a speeding event has occurred with a speed equal to the max speed value. For example, if a vehicle exceeds a first speed threshold of 70 mph for a speed duration of 30 seconds and reaches a maximum speed of 75 mph during that period, a speeding event may be detected with a maximum speed value of 75 mph. The controller may then send the max speed value to the remote station, indicating the maximum speed reached during the speeding event instead of the speed at the start and/or end of the speeding event.

Figure 5:
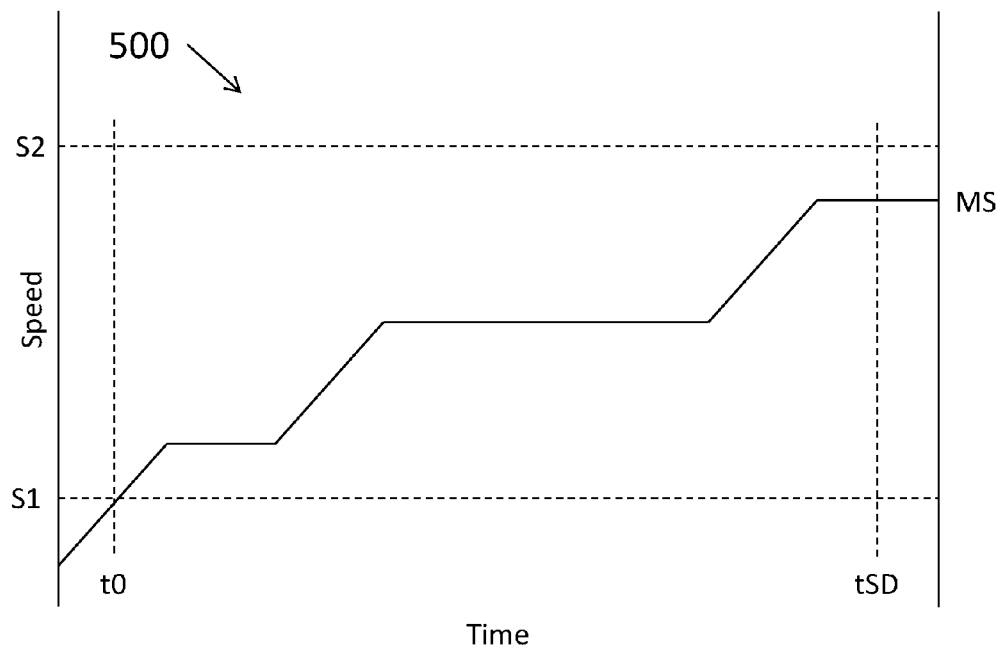
FIG. 5 is an line graph of an exemplary speeding detection method according to another example embodiment.

FIG. 5 illustrates a line graph 500 of an example speeding event where a vehicle exceeds a first speed threshold S1 for a speed duration tSD. As shown in FIG. 5, the vehicle speed exceeds the first speed threshold S1 at time t0. The vehicle speed stays above the first speed threshold S1 for the entire duration until tSD. The highest speed reached during this period is MS. Therefore, a speeding event is determined to take place with a max speed value of MS.

In some embodiments, the controller may generate a speeding event if the successive monitoring interval speeds are constant for a limit count of interval (e.g., for at least two intervals, three intervals, five intervals, etc.). If the speed stays constant it may indicate that the driver is not accelerating and then decelerating to pass another vehicle, but is instead speeding at a constant speed.

If any successive monitoring event exceeds a second speed threshold, the controller determines that a speeding event has occurred with a speed value equal to the second speed threshold. For example, if the first speed threshold is 70 mph and the second speed threshold is 80 mph, the controller may determine that a speeding event has occurred as soon as the vehicle speed exceeds 80 mph. The controller may not wait until the vehicle has exceeded the second speed threshold for a speed duration, but instead may determine that a speeding event has occurred as soon as the vehicle speed exceeds the second speed threshold.

The first speed threshold may be implemented as a lower speed threshold that allows drivers to exceed the first speed threshold for brief periods of time (e.g., to pass another vehicle, etc.) without triggering a speeding event. A speeding event may only be triggered when the vehicle exceeds the first speed threshold for a speed duration, thus preventing drivers from continuously speeding above the threshold for long periods of time. In contrast, the second speed threshold may be higher and may be a more restrictive threshold that triggers a speeding event any time the driver exceeds it. Accordingly, the second speed threshold may be higher than the first speed threshold. As an example, the first speed threshold may be a speed value at which drivers may occasionally exceed only briefly to pass other vehicles, while the second speed threshold may be a higher speed value that drivers should never exceed, even during passing of other vehicles.

Figure 6:
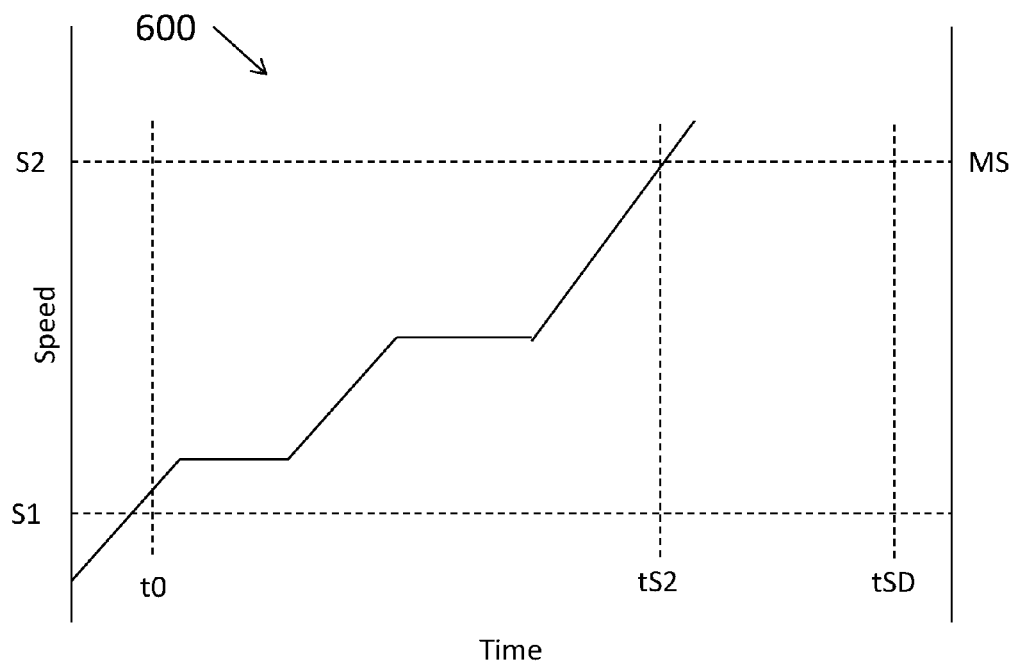
FIG. 6 is a line graph of another exemplary speeding detection method based on a speed exceeding multiple thresholds.

FIG. 6 illustrates a line graph 600 of an example speeding event where a vehicle exceeds a second speed threshold S2 before the speed duration tSD. In contrast to FIG. 5, a speeding event is determined in FIG. 6 as soon as the vehicle speed exceeds the second speed threshold S2 at time tS2. The speed value of the speeding event is MS, which is equal to the second speed threshold S2. In FIG. 5, the vehicle never exceeded the second speed threshold S2 so a speeding event was not determined until the speed duration tSD was reached.

The controller may be configured to determine that a speeding event has not occurred when a successive monitoring interval speed is less than the first speed threshold before the speed duration time period is reached. For example, if a driver exceeds the first speed threshold only briefly to pass another vehicle, but then slows down to below the first speed threshold in less time than the speed duration, a speeding event may not be determined. This may allow a driver to briefly exceed the first speed duration (e.g., to pass another vehicle, etc.) without triggering a speeding event if the driver quickly reduces the vehicle speed below the first speed duration.

Figure 7:
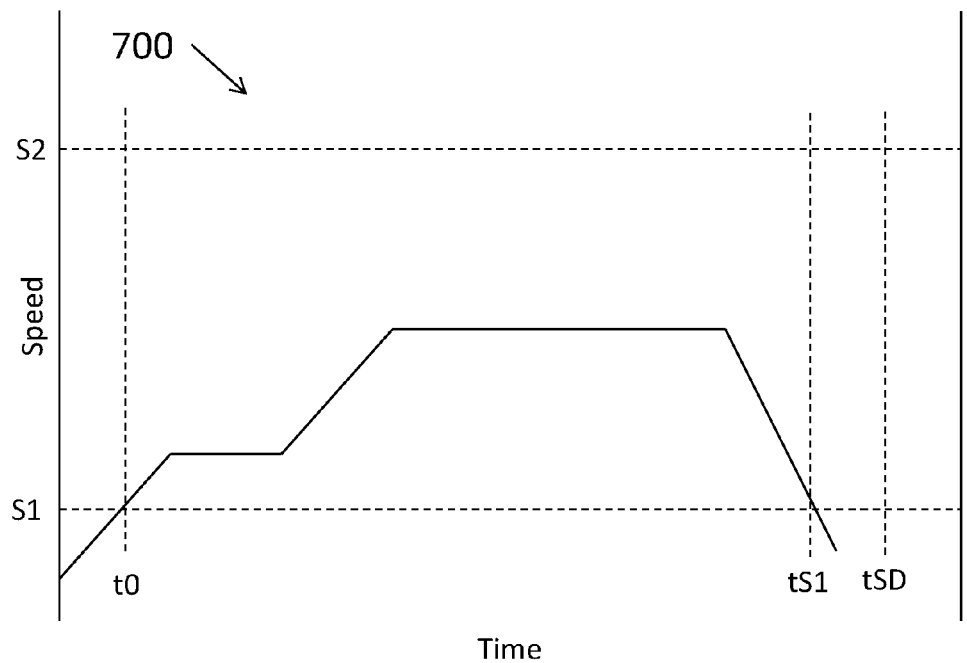
FIG. 7 is a line graph of another exemplary speeding detection method based on a speed exceeding only a lower threshold.

FIG. 7 illustrates a line graph 700 of an example where a vehicle exceeds the first speeding threshold S1 at time t0, but then reduces the vehicle speed below the first speed threshold S1 at time tS1. Because time tS1 is before the speed duration tSD, no speeding event is determined. Note that if the driver would have exceeded the second speed threshold S2 at any point (not shown in FIG. 7), a speeding event would have been determined even if the driver then reduced speed below the first speed threshold before the speed duration tSD.

The controller may be configured to count a number of times that the speed of the telematics device exceeds the first speed threshold. For example, every time a vehicle speed exceeds the first speed threshold, the controller may increment a speeding count variable, even if the vehicle speed reduces below the first speed threshold before the speed duration such that no speeding event is determined. In some embodiments, the count may only be incremented for instances that do not generate a speeding event (e.g., where the vehicle slows down below the first speed threshold before the speed duration, etc.).

If the speeding count variable exceeds a limit threshold (e.g., three times, five times, ten times, etc.) the controller may determine that an aggressive driving event has occurred. If a driver continually goes above and below the first speed threshold in an effort to avoid speeding detection (e.g., by making sure not to stay above the first speed threshold for longer than the speed duration, etc.) the driver may be driving aggressively, and the controller can catch the aggressive driving by noting that the driver has continually exceeded the first speed threshold too many times.

Figure 8:
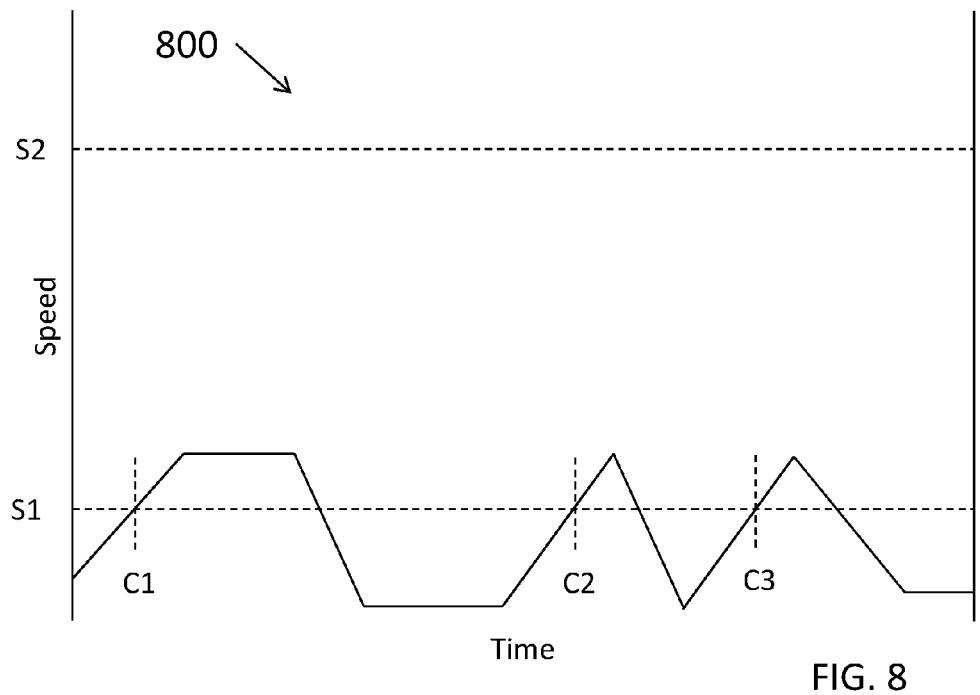
FIG. 8 is a line graph of an exemplary aggressive driving detection method based on a speed exceeding a threshold multiple times.

FIG. 8 illustrates a line graph 800 of an example where the driver exceeds the first speed threshold S1 several times, but always reduces vehicle speed below the threshold before a speed duration is reached. The controller counts each instance of exceeding the first speed threshold at times C1, C2 and C3. If the limit threshold is three instances of exceeding the first speed threshold, the controller may determine that an aggressive driving event has occurred. In some embodiments, the limit threshold may include a limit count of speed threshold violations within a specified time period (e.g., exceeding the first threshold at least three times in one minute, at least ten times in ten minutes, etc.).

In another example embodiment, the controller may be configured to determine whether the vehicle has exceeded multiple speed thresholds. The controller may monitor the speed of the telematics device via a location sensor. When the speed of the telematics device exceeds a first threshold for a speed duration, the controller may determine that a first speeding event has occurred. When the speed of the telematics device exceeds a second threshold for a speed duration, the controller may determine that a second speeding event has occurred. This may be repeated for a third speed threshold, fourth speed threshold, fifth speed threshold, etc. for as many speed thresholds as desired.

Figure 9:
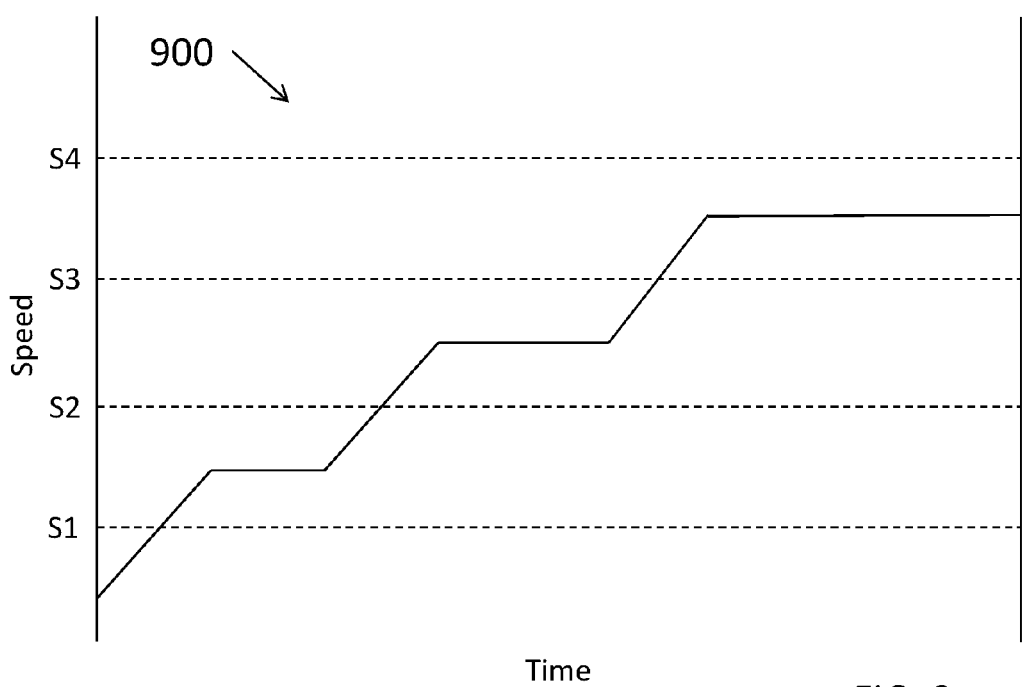
FIG. 9 is a line graph of an exemplary speeding detection method having multiple speed thresholds.

Accordingly, the controller may determine how many speeding thresholds a vehicle exceeded during a specified period. For example, if the speeding thresholds are 65 mph, 70 mph, 75 mph, 80 mph, and 85 mph, and a vehicle reaches a maximum speed of 78 mph, the controller may determine that the vehicle exceeded the first three speed thresholds, but not the last two. FIG. 9 illustrates a line graph 900 of an example where a vehicle exceeds the first three speed thresholds S1, S2 and S3, but not the last speed threshold S4.

The controller may only determine one (e.g., the first, etc.) speeding event for each speed threshold during a specified period (e.g., an ignition cycle, one hour, etc.). For example, the controller may only determine one speeding event for each speed threshold between an ignition turn on event and an ignition turn off event. This may reduce a data load on the wireless communication module, the remote station server, etc. Instead of sending several reports of the same event, the telematics device may only send one report related to a particular event, which may reduce traffic on the server. For example, a report may be sent separately for each speeding event at each speed threshold, a single report may be sent detailing multiple speeding events at multiple thresholds, etc. In some applications, information about whether or not the driver violated each speed threshold may be more important than how many times the driver violated each speed threshold.

Each of the multiple speed thresholds may be associated with a speed duration, such that the vehicle speed must exceed the threshold for at least a speed duration. The speed duration may be the same for each speed threshold, different for different speed thresholds, etc.

In another example embodiment, speeding events may be determined based on distance traveled while the vehicle is speeding. A telematics device may obtain a speed of the vehicle (e.g., via a GPS antenna, a vehicle interface, etc.). When a speed of the vehicle exceeds a speed threshold, the device may track the distance traveled by the vehicle while the vehicle is speeding. If the vehicle exceeds a distance threshold (e.g., 500 yards, ½ mile, one mile, etc.) while speeding, the device may determine that a speeding event has occurred. For example, a vehicle may exceed the speed threshold for one mile, at which point the device determines that a vehicle speeding event has occurred.

In some embodiments, vehicle speeding may be determined based on distance traveled within a specified time period. If a vehicle distance traveled exceeds a distance threshold in less amount of time than a specified time period, the device may determine that a speeding event has occurred. For example, if a vehicle travels more than one mile in less than one minute (which would indicate a speed of greater than 60 mph), a speeding event may be determined.

Speeding detection based on distance traveled may also be combined with speeding detection based on speeding for a time period in excess of a speed duration threshold. As described above, a vehicle may be determined as speeding if the vehicle speed exceeds a speed threshold (e.g., 70 mph, etc.) for more than a speed duration (e.g., 30 seconds, etc.). This detection may be combined with speed detection based on distance traveled. For example, speeding may be determined if either vehicle speed exceeds a speed threshold for a specified distance, or if vehicle speed exceeds the speed threshold for a specified time duration. Speeding events could be determined if either condition is met, if both conditions are met, etc. This may provide more accurate detection of vehicle speeding events.

In some embodiments, the telematics device may count the number of speeding events that are generated (e.g., detection based on speeding over time, detection based on speeding over a distance, etc.). If the count exceeds a threshold count value (e.g., three times, five times, ten times, etc.), an aggressive driving event may be generated. This count may be based on a speeding frequency, such that the device counts the number of speeding events generated within a time period (e.g., number of speeding events within 10 minutes, within one hour, etc.). If the speeding event frequency exceeds a threshold, an aggressive driving event may be determined. Accordingly, the telematics device can track how many times the driver is exceeding the speed limit and report aggressive drivers to an administrator.

Any of the threshold values described herein (e.g., speed thresholds, count limit thresholds, speed durations, etc.) may be configurable according to desired settings. The values may be configurable by a user, configurable by settings on the device, configurable remotely from a server, etc. This may allow users to tune the threshold values to detect speeding events for the particular application, increase the reliability of correctly detecting speeding events, etc.

In some embodiments, the controller may store the speed in memory when a speeding event occurs, but not send the speed to the remote station immediately. For example, the controller may only indicate to the remote station that a speeding event has occurred, without sending the speed during the speeding event. The controller may then be configured to receive a query from the remote station and, in response to the received query, transmit a max speed value to the remote station for any determined speeding event. The max speed value may be the stored speed during the speeding event. Accordingly, an administrator at the remote station may be able to determine a max speed of the vehicle at any time, including previous speeding events.

In some embodiments, the controller may store a matrix of multiple parameters corresponding to each of multiple speeding events. The matrix of multiple parameters may provide additional information about the speeding events to assist an administrator in more accurately reviewing driver speeding behavior. The controller may periodically transmit the matrix of multiple parameters to the remote station. Alternatively, or in addition, the controller may send the matrix of multiple parameters to the remote station in response to a query from the remote station.

In some embodiments, the controller may determine that a speeding event has occurred as soon as the speed of the telematics device exceeds the first threshold. A speeding event may be transmitted to the remote station immediately once the speeding event is detected. The controller may continue to transmit a speeding event for each reminder time period (e.g., thirty seconds, one minute, five minutes, etc.) that the telematics device continued to exceed the first speed threshold. This may allow an administrator to observe that a vehicle is continually speeding.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific numerical dimensions and values, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 23, 3-10, and 3-9.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "includes," "including," "has," "have," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A telematics device for a vehicle, the device comprising:
    a controller; and
    a wireless communication module coupled to the controller, the wireless communication module configured to transmit data from the controller to a remote station;
    wherein the controller is configured to:
        periodically obtain a speed of the vehicle according to a monitoring interval;
        determine a first monitoring interval in which the speed of the vehicle has exceeded a first speed threshold and store the speed during the first monitoring interval as a max speed value;
        compare each successive monitoring interval speed to a previous monitoring interval speed;
        when the successive monitoring interval speed is greater than the max speed value, update the max speed value with the successive monitoring interval speed;
        when each successive monitoring interval speed is above the first speed threshold for a speed duration, determine that a first speeding event has occurred with a first speed value equal to the max speed value;
        when any successive monitoring interval speed exceeds a second speed threshold, determine that a second speeding event has occurred with a second speed value equal to the second speed threshold;
        count a number of times that a distance threshold has been exceeded by a distance traveled by the vehicle while the speed of the vehicle exceeds the first speed threshold;
        when the count exceeds a limit threshold within a specified time period, determine that an aggressive driving event has occurred.

2. The telematics device of claim 1, further comprising:
    a location sensor coupled to the controller and configured to determine a speed of the telematics device;
    wherein the telematics device is configured to obtain the vehicle speed via the location sensor and/or a vehicle interface connection.

3. The telematics device of claim 1, wherein at least one of the first speed threshold, the speed duration, the second speed threshold, the limit threshold and the specified time period are configurable from the remote station.

4. The telematics device of claim 1, wherein the controller is configured to determine that a speeding event has not occurred when any successive monitoring interval speed is less than the first speed threshold before an end of the speed duration is reached.

5. The telematics device of claim 1, wherein the controller is configured to:
receive a query from the remote station; and
in response to the received query, transmit the max speed value to the remote station for any determined speeding event.

6. The telematics device of claim 5, wherein the controller is configured to store a matrix of multiple parameters corresponding to each of multiple determined speeding events.

7. The telematics device of claim 6, wherein the controller is configured to:
in response to the received query, transmit the matrix of multiple parameters to the remote station; and/or
periodically transmit the matrix of multiple parameters to the remote station.

8. The telematics device of claim 1, wherein the controller is configured to:
determine that a speeding event has occurred as soon as the speed of the vehicle exceeds the first threshold and transmit the speeding event to the remote station; and
continue to transmit the speeding event for each reminder time period that the speed of the vehicle continues to exceed the first speed threshold.

9. A telematics device for a vehicle, the device comprising:
a controller;
a wireless communication module coupled to the controller, the wireless communication module configured to transmit data from the controller to a remote station; and
a location sensor coupled to the controller and configured to determine a speed of the telematics device;
wherein the controller is configured to:
monitor the speed of the vehicle via the location sensor and/or a vehicle interface connection;
count a number of times that a distance threshold has been exceeded by a distance traveled by the vehicle while the speed of the vehicle exceeds a speed threshold; and
when the count exceeds a limit threshold within a specified time period, determine that an aggressive driving event has occurred.

10. The telematics device of claim 9, wherein
the limit threshold and the specified time period are configurable from the remote station.

11. A telematics device for a vehicle, the device comprising:
a controller;
a wireless communication module coupled to the controller, the wireless communication module configured to transmit data from the controller to a remote station; and
a location sensor coupled to the controller and configured to determine a speed of the telematics device;
wherein the controller is configured to:
monitor the speed of the vehicle via the location sensor and/or a vehicle interface connection;
when the speed of the vehicle exceeds a first speed threshold, monitor a distance traveled by the vehicle while the speed of the vehicle is exceeding the first speed threshold, and when the monitored distance traveled exceeds a distance threshold, determine that a first speeding event has occurred.

12. The telematics device of claim 11, wherein the location sensor is a global positioning system (GPS) receiver.

13. The telematics device of claim 11, wherein the distance threshold is a first distance threshold, and the controller is configured to:
when the speed of the vehicle exceeds a second speed threshold for at least a second distance threshold, determine that a second speeding event has occurred;
wherein the second speed threshold is greater than the first speed threshold.

14. The telematics device of claim 13, wherein the controller is configured to, when the speed of the vehicle exceeds a third speed threshold for at least a third distance threshold, determine that a third speeding event has occurred, wherein the third speed threshold is greater than the first speed threshold and the second speed threshold.

15. The telematics device of claim 14, wherein the controller is configured to, when the speed of the vehicle exceeds a fourth speed threshold for at least a fourth distance threshold, determine that a fourth speeding event has occurred, wherein the fourth speed threshold is greater than the first speed threshold, the second speed threshold and the third speed threshold.

16. The telematics device of claim 15, wherein the controller is configured to, when the speed of the vehicle exceeds a fifth speed threshold for at least a fifth distance threshold, determine that a fifth speeding event has occurred, wherein the fifth speed threshold is greater than the first speed threshold, the second speed threshold, the third speed threshold and the fourth speed threshold.

17. The telematics device of claim 11, wherein:
the controller is configured to determine only one first speeding event during an ignition cycle and to determine only one second speeding event during the ignition cycle, wherein the ignition cycle is a period of time between an ignition turn on event and an ignition turn off event; and/or
the first and second speeding thresholds are configurable from the remote station.

18. The telematics device of claim 11, wherein the controller is configured to transmit an event report to the remote station, the event report including the determined first speeding event.

19. The telematics device of claim 18, wherein the event report includes a latitude, longitude and timestamp corresponding to each event in the event report.

20. The telematics device of claim 11, wherein the controller is configured to:
count a number of times the determined first speeding event has occurred; and
when the count exceeds a speeding event threshold value, determine that an aggressive driving event has occurred.

21. A telematics device for a vehicle, the device comprising:
a controller;
a wireless communication module coupled to the controller, the wireless communication module configured to transmit data from the controller to a remote station; and
a location sensor coupled to the controller and configured to determine a speed of the telematics device;
wherein the controller is configured to:

periodically monitor the speed of the vehicle via the location sensor and/or a vehicle interface connection according to a monitoring interval;

when the speed of the vehicle exceeds a first speed threshold, monitor a distance traveled by the vehicle while the speed of the telematics device is exceeding the first speed threshold, and when the monitored distance traveled exceeds a distance threshold, determine that a first speeding event has occurred;

when the speed of the vehicle exceeds a second speed threshold, monitor an amount of time that the speed of the vehicle exceeds the second speed threshold, and when the monitored amount of time exceeds a speed duration, determine that a second speeding event has occurred;

count a number of times the determined first and/or second speeding events have occurred; and when the count exceeds a speeding event threshold value, determine that an aggressive driving event has occurred.

22. The telematics device of claim 21, wherein at least one of the first speed threshold, the distance threshold, the second speed threshold, the speed duration and the speeding event threshold value are configurable from the remote station.

* * * * *